(12) United States Patent
Carlsson et al.

(10) Patent No.: US 10,576,950 B2
(45) Date of Patent: Mar. 3, 2020

(54) METHOD AND A SYSTEM FOR CONTROLLING VEHICLE SPEED

(71) Applicant: VOLVO TRUCK CORPORATION, Göteborg (SE)

(72) Inventors: Tobias Carlsson, Olofstorp (SE); Anders Eriksson, Torslanda (SE); Lars Karlsson, Göteborg (SE); Henrik Andersson, Mölnlycke (SE)

(73) Assignee: VOLVO TRUCK CORPORATION, Göteborg (SE)

(*) Notice: Subject to any disclaimer, the term of this patent is extended or adjusted under 35 U.S.C. 154(b) by 0 days.

(21) Appl. No.: 15/755,197

(22) PCT Filed: Aug. 28, 2015

(86) PCT No.: PCT/EP2015/069728
§ 371 (c)(1),
(2) Date: Feb. 26, 2018

(87) PCT Pub. No.: WO2017/036492
PCT Pub. Date: Mar. 9, 2017

(65) Prior Publication Data
US 2018/0244247 A1  Aug. 30, 2018

(51) Int. Cl.
*B60T 8/32* (2006.01)
*G05D 1/00* (2006.01)
(Continued)

(52) U.S. Cl.
CPC ............ *B60T 8/1708* (2013.01); *B60T 8/171* (2013.01); *B60T 8/172* (2013.01); *B60T 8/245* (2013.01);
(Continued)

(58) Field of Classification Search
CPC .......... B60T 8/1708; B60T 7/12; B60T 8/171; B60T 8/172; B60T 8/245; B60T 8/323;
(Continued)

(56) References Cited

U.S. PATENT DOCUMENTS

| 4,485,444 A | 11/1984 | Maruyama et al. |
| 2004/0040765 A1* | 3/2004 | Satou .................. B60K 31/04 180/170 |

(Continued)

FOREIGN PATENT DOCUMENTS

| EP | 2626269 A2 | 8/2013 |
| JP | 2006213294 A | 8/2006 |

(Continued)

OTHER PUBLICATIONS

International Search Report (dated Apr. 28, 2016) for corresponding International App. PCT/EP2015/069728.

*Primary Examiner* — Mahmoud S Ismail
(74) *Attorney, Agent, or Firm* — Venable LLP; Jeffri A. Kaminski

(57) ABSTRACT

A device and a method for controlling vehicle speed in a vehicle equipped with brake cruise control when the vehicle is travelling downhill are provided. The method involves driving a vehicle downhill with the brake set speed set to a first brake set speed; detecting a current vehicle speed; automatically applying a brake torque using at least an auxiliary brake to maintain the first brake set speed; and detecting a manual application of a vehicle service brake, in order to decrease vehicle speed. If a control unit detects that the driver is applying the service brake, then the control unit is automatically arranged to set the brake set speed to a second brake set speed that is lower than the first brake set (Continued)

speed; and to apply a brake torque using at least the auxiliary brake if a detected current vehicle speed exceeds the second brake set speed.

13 Claims, 5 Drawing Sheets

(51) Int. Cl.

| | | |
|---|---|---|
| *G06F 7/00* | (2006.01) | |
| *G06F 17/00* | (2019.01) | |
| *B60T 8/17* | (2006.01) | |
| *B60T 8/171* | (2006.01) | |
| *B60T 8/172* | (2006.01) | |
| *B60T 8/24* | (2006.01) | |
| *B60K 31/00* | (2006.01) | |
| *B60K 31/04* | (2006.01) | |

(52) U.S. Cl.
CPC .......... *B60T 8/323* (2013.01); *B60T 2201/02* (2013.01); *B60T 2201/04* (2013.01); *B60T 2250/04* (2013.01); *B60Y 2200/145* (2013.01); *B60Y 2200/148* (2013.01); *B60Y 2300/146* (2013.01); *B60Y 2300/43* (2013.01); *B60Y 2400/303* (2013.01)

(58) Field of Classification Search
CPC ... B60T 2201/02; B60W 30/143; B60K 31/00
USPC .................................. 701/93; 180/170, 179
See application file for complete search history.

(56) References Cited

U.S. PATENT DOCUMENTS

| | | | |
|---|---|---|---|
| 2004/0135022 A1 | 10/2004 | Inoue | |
| 2004/0195022 A1* | 10/2004 | Inoue ................. | B60K 31/0008 180/170 |
| 2005/0096183 A1 | 5/2005 | Watanabe et al. | |
| 2006/0241844 A1 | 10/2006 | Mori et al. | |
| 2007/0099759 A1 | 5/2007 | Jamzadeh | |
| 2009/0173562 A1* | 7/2009 | Namari ................. | F02D 11/105 180/179 |
| 2017/0096140 A1* | 4/2017 | Woodley ............... | B60W 50/10 |

FOREIGN PATENT DOCUMENTS

| | | | | |
|---|---|---|---|---|
| JP | 2006298178 A | 11/2006 | | |
| JP | 2014237391 A | 12/2014 | | |
| WO | 03066365 A1 | 8/2003 | | |
| WO | 2008094111 A1 | 8/2006 | | |
| WO | WO-2008094111 A1 * | 8/2008 | ........... | B60W 10/06 |
| WO | 2014139704 A1 | 9/2014 | | |

\* cited by examiner

METHOD AND A SYSTEM FOR CONTROLLING VEHICLE SPEED

BACKGROUND AND SUMMARY

The invention relates to a method and a system for controlling vehicle speed in a vehicle equipped with brake cruise control when the vehicle is travelling downhill. The invention can be applied in heavy-duty vehicles, such as trucks, buses and construction equipment. Although the invention will be described with respect to a heavy-duty vehicle, the invention is not restricted to this particular vehicle, but may also be used in other vehicles such as articulated haulers, wheel loaders, and other working machines or automobiles.

Driver assistance systems for automatically controlling the speed of a vehicle, often termed cruise control systems, allow a driver to specify a selectable driving speed via actuating means. The set speed is then maintained independently of the operation of an accelerator pedal of the vehicle. The speed can be set by the driver and can also be retained independently of the driving situation, such as uphill or downhill driving. The vehicle will then use suitable means such as auxiliary brakes or service brakes to maintain the set speed.

DE 10 2006 051 179 A1 (corresponding to U.S. Patent App. Pub. US2007/0099579) relates to a method for automatic downward velocity control, commonly known as brake cruise control, which is capable of absorbing energy induced by the inclination automatically. In this way the driver must no longer be active to maintain a substantially constant traveling speed. The downward velocity control is triggered when the accelerator pedal is released, and the vehicle begins to accelerate downhill. The vehicle speed is controlled towards target vehicle speed, which is a desired predetermined constant vehicle speed set by the driver.

When travelling downhill in a vehicle with brake cruise control, it is not always possible to maintain the brake set speed by using auxiliary brakes only. Reducing the vehicle speed and/or manually resetting the brake set speed is often necessary to avoid over-using the service brakes in long or steep downhill conditions. Extended periods of service brake actuation can cause the brakes to overheat, which can cause the brakes to wear at an increased rate and may even damage the brakes.

In a conventional vehicle this has to be done by the driver by manually adjusting the brake set speed and pressing the brake pedal to actuate the service brakes to reduce the vehicle speed down to the desired speed. At the end of the downhill road section, the brake set speed has to be manually adjusted by the driver back to the originally set value.

It is desirable to provide a method and a system for controlling vehicle speed in a vehicle equipped with brake cruise control which eliminates the above problems. The invention allows, according to an aspect thereof, automatic control of the speed of a vehicle requiring a minimum of intervention and providing a high level of comfort for the driver.

It is desirable to provide a method and a system for controlling vehicle speed in a vehicle equipped with brake cruise control.

In this context, the term "service brake" is used to denote the normal, or main brakes used in heavy-duty vehicles, usually operated by the driver depressing a service brake pedal. The service brakes are often, but not necessarily, air brakes operated by compressed air controlling friction brakes provided on each wheel to be braked on the vehicle.

The term "auxiliary brakes" is used to denote additional means for assisting braking of the vehicle. Auxiliary brakes are used in addition to the service brakes and allow for prolonged brake application without requiring assistance from the service brakes. In this way, wear and unnecessary heating of the service brakes can be avoided. Such auxiliary brakes can comprise an exhaust valve, for activating an exhaust brake, engine brake valves, for activating a compression release engine brake, a fluid retarder, for generating a braking force on a propeller shaft, or means for driving a compressor or generator to generate a braking force. For electric and hybrid electric vehicles the auxiliary brake can comprise a generator, a motor-generator or other suitable means.

The invention, according to an aspect thereof is applicable to vehicles provided with a brake cruise control system. According to an aspect of the invention the system can be used for vehicles provided with internal combustion engines, as well as for electric and hybrid electric vehicles. This cruise control system can be enabled by the driver prior to or during downhill travel. When the actual, or current vehicle speed exceeds a brake set speed set by the driver-, an auxiliary brake, such as an engine brake, a motor-generator, or similar, will engage to maintain that speed within the limits of the auxiliary brake.

According to a first aspect of the invention, a method for controlling vehicle speed in a vehicle equipped with brake cruise control when the vehicle is travelling downhill is provided. The method comprises the steps of;

driving a vehicle downhill with the brake set speed set to a first brake set speed;

detecting a current vehicle speed;

automatically applying a brake torque using at least an auxiliary brake to maintain the first brake set speed;

detecting a manual application of a vehicle service brake, in order to decrease the vehicle speed;

In this context, the steps of detecting a current vehicle speed and automatically applying a brake torque using at least an auxiliary brake to maintain the first brake set speed are actions performed by the brake cruise control without input from the driver.

If a control unit provided in the vehicle detects manual application of the service brake, i.e the driver is applying the service brake, then the control unit is automatically arranged to perform the steps of:

setting the brake set speed to a second brake set speed that is lower than the first brake set speed; and applying a brake torque using at least the auxiliary brake if a detected current vehicle speed exceeds the second brake set speed.

An advantage of this method is that the driver is not required to perform any action, apart from briefly applying the brake pedal, to reduce the speed of the vehicle to a lower brake set speed. No additional switches or controls need to be actuated and no new set speed has to be selected by the driver. A reduction of the manual actions required for this purpose allows the driver to concentrate on the road and improves the driving comfort.

According to a first alternative example, the control unit is automatically arranged to set the second brake set speed at a level where the second brake set speed can be maintained by the auxiliary brake.

According to a second alternative example, the control unit is automatically arranged to set the second brake set speed at the vehicle speed detected when the driver released the service brakes.

The method is arranged to repeat the above steps until it is detected that the downhill condition has ended, i.e. the slope is levelling out and normal cruise control can be resumed. Hence, when travelling downhill with the brake set speed to the second brake set speed it is possible to perform further speed reductions if required. Should the control unit detect a further manual application the service brake, for instance caused by a steeper than expected slope, then the brake set speed is set to a third brake set speed that is lower than the second brake set speed.

When the control unit detects that the downhill condition has ended then the brake cruise control brake set speed is restored to the first brake set speed and one or more upshifts are performed. According to a first alternative example this step can be performed automatically in response to one or more signals transmitted to the control unit by an inclination sensor, an accelerometer, an on-board topographic database, a GPS-receiver, or a similar suitable device.

According to a second alternative example the brake set speed is restored to the first brake set speed when the driver issues a resume command. Such a resume command can involve the driver actuating an accelerator means or a resume switch on the dashboard, or on or adjacent the steering wheel. The resume command is detected by the control unit, which restores the first brake set speed An advantage of the latter method steps is that the driver is not required to perform any action, or alternatively a single action involving a brief application of the accelerator pedal or actuating one switch, to resume the first brake set speed of the vehicle. No additional switches or controls need to be actuated and no new/earlier set speed has to be selected by the driver. This further reduces the manual actions required, which allows the driver to concentrate on the road and improves the driving comfort.

According to a second aspect of the invention, a vehicle speed control system in a vehicle equipped with brake cruise control when the vehicle is travelling downhill is provided. The system comprises a sensor arranged to detect a current vehicle speed; a service brake;

at least one auxiliary brake; and a control unit having a user selectable input for receiving a brake set speed, said control unit being arranged to compare the current vehicle speed with a first brake set speed and control the auxiliary brakes to maintain the first brake set speed. The first brake set speed can be set once by the driver and is then stored in the control unit for future use. Alternatively, the system can prompt the driver for an input, e.g. by displaying the currently stored set speed value, and if no input is provided by the driver then the stored first brake set speed is used. The speed sensor can be a separate sensor provided for this purpose, a sensor forming part of an ABS arrangement in the service brake, or a virtual sensor where the vehicle speed is calculated from suitable engine and transmission parameters. The control unit is arranged to detect if the service brake is applied to retard the vehicle speed. When a manual application of the service brakes is detected, the control unit is automatically arranged to set the brake set speed to a second brake set speed that is lower than the first brake set speed. The control unit is subsequently arranged to apply a brake torque using at least the auxiliary brake if the current vehicle speed exceeds the second brake set speed. In this way, the auxiliary brake is used as the primary source of brake torque. Only when the auxiliary brake or brakes cannot maintain the second brake set speed will the service brake be actuated by the control unit. Automatic actuation of the service brakes should only be performed during short periods of time of intermittently the driver may be notified if prolonged automatic application of the service brakes is carried out.

According to a first alternative example the control unit is arranged to set the second brake set speed at a level where the brake set speed can be maintained by the auxiliary brake or brakes.

According to a second alternative example the control unit is arranged to set the second brake set speed at the vehicle speed detected when the driver released the service brakes.

When the control unit detects that the downhill condition has ended then the brake cruise control brake set speed is restored to the first brake set speed. According to a first alternative example the control unit is arranged to restore the brake set speed to the first brake set speed when the control unit has detected that the downhill condition has ended. The control unit is arranged to perform this action in response to one or more signals transmitted to the control unit by an inclination sensor, an accelerometer, an on-board topographic database, a GPS-receiver, or a similar suitable device.

According to a second alternative example the control unit is arranged to restore the brake set speed to the first brake set speed when the driver issues a resume command. Such a resume command can involve the driver actuating an accelerator means or a resume switch on the dashboard, or on or adjacent the steering wheel.

According to a third aspect of the invention, a computer program is provided comprising program code means for performing the above-mentioned method steps for controlling vehicle speed in a vehicle equipped with brake cruise control when said program is run on a computer. The invention further relates, according to an aspect thereof, to a computer readable medium carrying a computer program comprising program code means for performing the above-mentioned method steps for controlling vehicle speed in a vehicle equipped with brake cruise control when said program product is run on a computer. Finally, the invention further relates, according to an aspect thereof, to a control unit for controlling vehicle speed in a vehicle equipped with brake cruise control, the control unit being configured to perform the steps of the above-mentioned method.

By the provision of a method and a system which involve automatic control of a brake cruise control system, the advantage is that the driver can be relieved of a number of the manual actions by transferring control of the brake cruise control system to a control unit. With the brake cruise control system active, the driver merely needs to apply the service brakes to indicate that a speed reduction is desired. When the service brakes are released, the control unit will automatically set the brake set speed to a lower value. This lower value is retained to the end of the downhill road section, or until the driver indicates a further speed reduction. At the end of a downhill section the control unit can be arranged to automatically reset the brake set speed to the initial brake set speed. Alternatively, the driver can indicate that the initial brake set speed is to be reset by issuing a resume command, for instance by actuating a resume switch or by depressing an accelerator pedal. In this way the number of manual actions required by the driver can be reduced to an absolute minimum, allowing the driver to concentrate on the road and improving the comfort for the driver.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
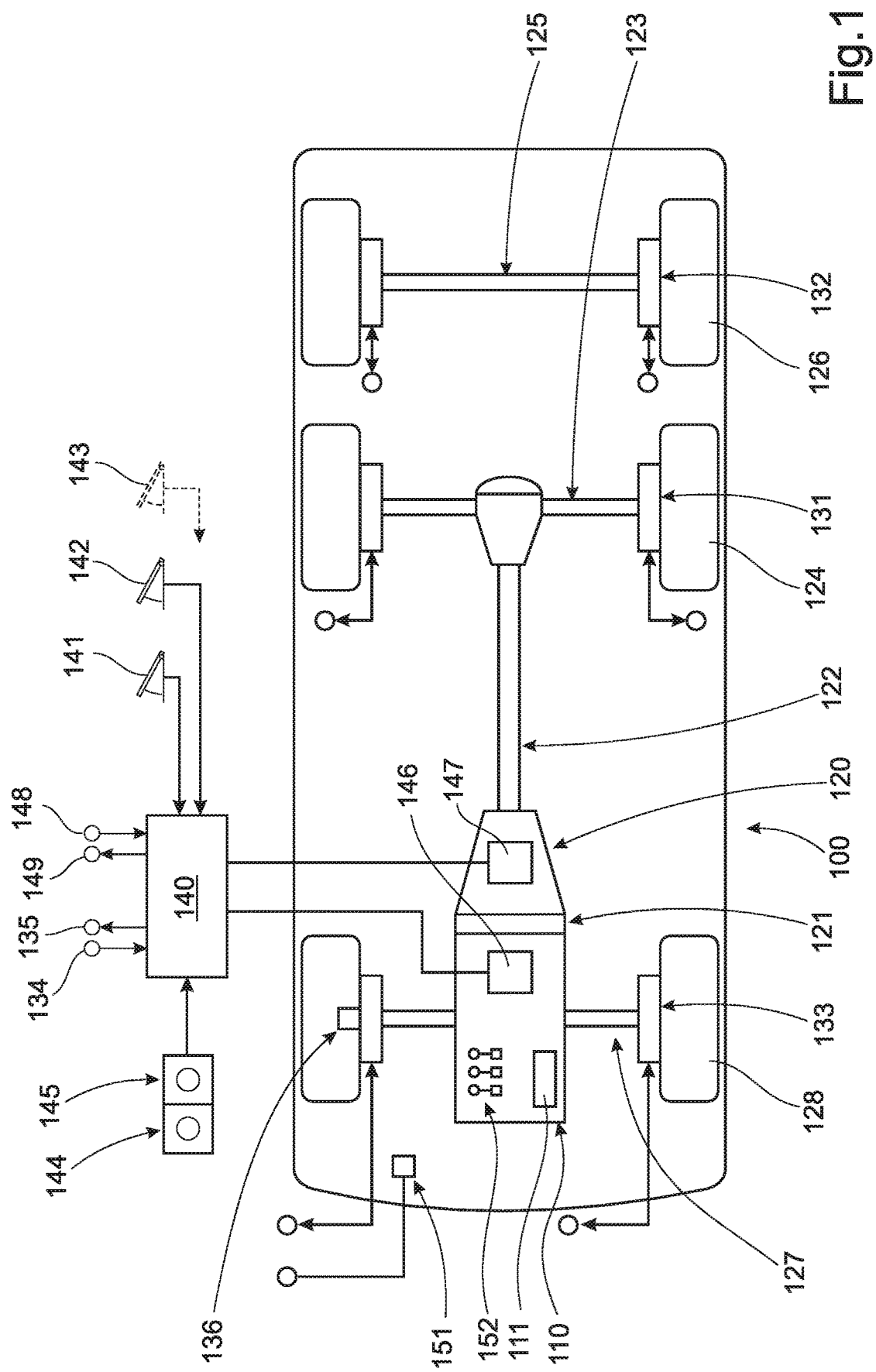
FIG. 1 shows a schematic vehicle provided with a vehicle speed control system according to one embodiment of the invention.

FIG. 1 shows a schematic vehicle provided with a vehicle speed control system according to one embodiment of the invention. FIG. 1 shows a vehicle 100, such as a tractor of a tractor semi-trailer vehicle, having an electronically controlled internal combustion engine 110 coupled to a transmission 120 via a clutch mechanism 121. It should be noted that a vehicle as shown in FIG. 1 only represents one of the possible applications for the system and method of the present invention. The present invention can be implemented in any type of commercial or industrial vehicle comprising a vehicle speed control system as described herein.

The transmission 120 can be an automated mechanical transmission or an alternative suitable transmission connected to an output shaft 122 coupled to a driven axle 123 driving a pair of driven wheels 124. The vehicle 100 includes at least two axles such as a steerable axle 127 and at least one rear driven axle 123. FIG. 1 shows a rear driven axle 123 and a trailing axle 125 with associated wheels 124, 126, as well as a steerable axle 127 with associated wheels 128. Each axle 123, 125, 127 supports corresponding wheels 124, 126, 128 having service brake components 131, 132, 133 which can be manually or automatically actuated depending upon the particular application and operating conditions. For example, a vehicle equipped with an anti-lock braking system (ABS) can assume automatic control of braking under appropriate conditions such as when the vehicle is braking and the system detects a sufficient slip differential among one or more wheels, or when the vehicle travels downhill under the control of a cruise control system. The service brake components 131, 132, 133 include wheel speed sensors and electronically controlled pressure valves (not shown) to effect control of the vehicle braking system. The service brake components 131, 132, 133 are connected to a central electronic control unit (ECU) 140 by means of suitable wiring, as schematically indicated by the input 134 and output 135 in the figure. A wheel speed sensor 136 is schematically indicated in FIG. 1. The output signal from one or more such sensors can be used for calculating the vehicle speed.

The vehicle 100 includes conventional operator controls such as an accelerator pedal 141, a brake pedal 142 and an optional clutch pedal 143 (for manual transmissions), as well as an operator interface, such as dashboard control console (not shown). The dashboard control console can include any one of a number of output devices, such as lights, displays, buzzers, gages, and the like, and various input devices, such as switches, push buttons, potentiometers, or the like. Examples of input devices can be controllers 144, 145 for setting and/or restoring a brake cruise control set speed in in a brake cruise control system. The controller 144 for setting the brake cruise control set speed and the controller 145 for restoring the brake cruise control set speed are both connected to the ECU 140.

The vehicle control system includes the central ECU 140 which is connected to electronic control modules 146, 147 for the engine 110 and the transmission 120, respectively. The ECU 140 also communicates with a variety of sensors via inputs 148 and with numerous actuators via outputs 149. Sensors (not shown) may include a steering angle sensor, wheel speed sensors (included in service brake components 131, 132, 133), an electronic accelerator pedal sensor, a brake pedal sensor or switch, a clutch control/sensor, an output speed sensor, a sensor/accelerometer 151 for indicating vehicle inclination, at least longitudinal inclination, and sensors for various engine parameters 152.

During downhill travel with the brake cruise control activated the ECU 140 monitors information from the sensors and evaluates their input to determine parameters such as current engine speed and torque, brake pedal position, accelerator position, road speed, cruise control status, and cruise control brake set speed, cruise control switches, clutch pedal position, among many others.

Actuators may include a shift actuator for automatically effecting a gear shift within transmission 120, electronically controlled pressure valves (included in service brake components 131, 132, 133), and one or more auxiliary brakes, such as an engine retarder 111. An engine retarder is a device utilized to supplement the service brakes 131, 132, 133 when descending long grades and to prolong service brake life in high-frequency start and stop operation. Retarders may be categorized as engine brakes, exhaust brakes, hydraulic retarders and electric retarders. One example of an engine retarder is an engine brake such as the well-known "Jake brake", which converts a power producing diesel engine into a power absorbing air compressor. This is achieved by shutting off the fuel and hydraulically opening the exhaust valve as the piston approaches top dead center during the compression stroke. Many engine manufacturers disable the engine brake when cruise control is engaged. However, the present invention can utilize the engine retarder when the brake cruise control is engaged to enhance vehicle deceleration. This is accomplished by directly controlling the engine retarder during downhill travel.

The ECU 140 contains logic rules, or algorithms implemented in a variety of combinations of hardware circuitry components and programmed microprocessors to effect control of various vehicle systems and subsystems. Cruise control functions can be incorporated as a cruise control block within the ECU 140 which block represents the logic rules necessary to implement brake cruise control functions. The operation of the system will be described in further detail below.

Figure 2:
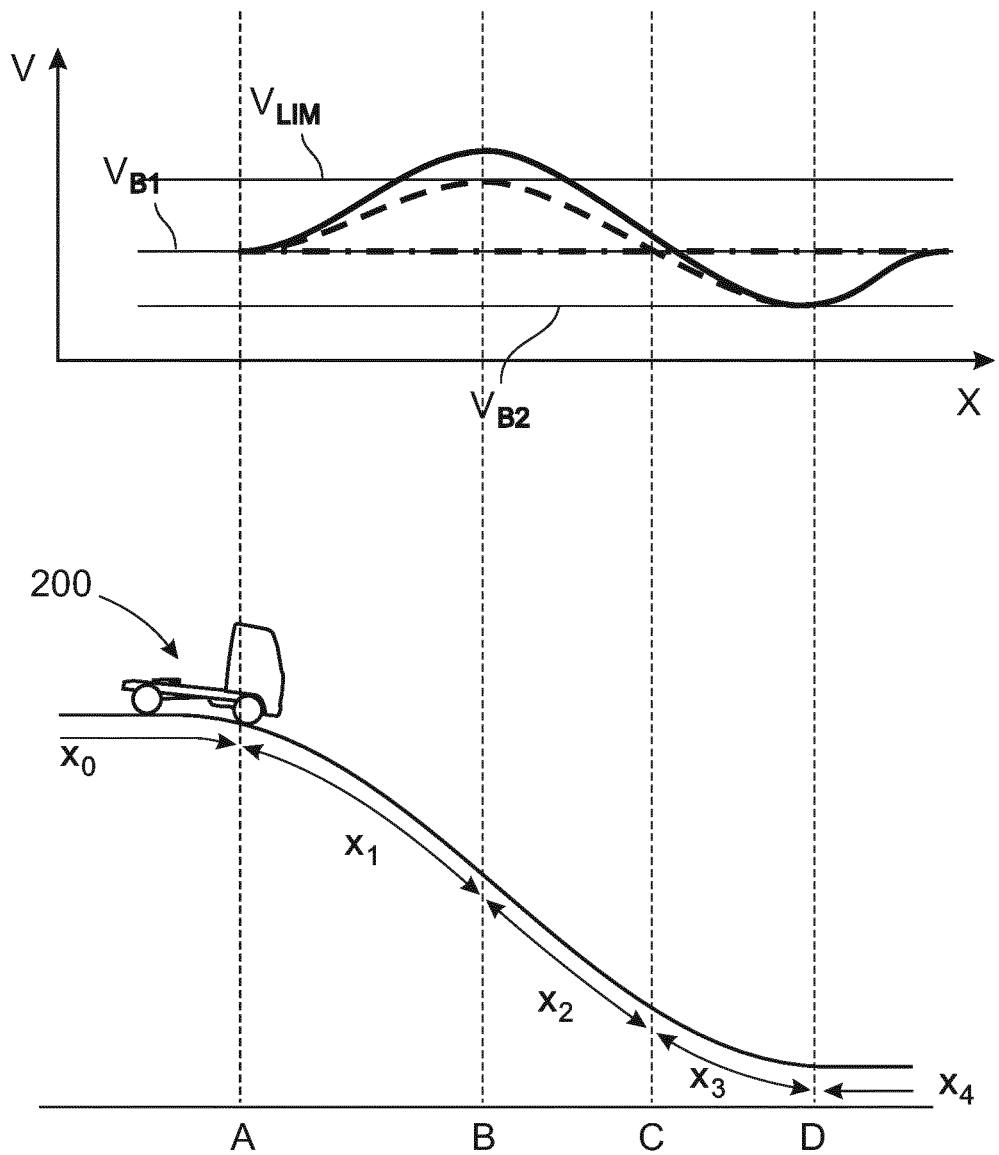
FIG. 2 shows a schematic diagram illustrating an example of speed variation for a vehicle provided with a brake cruise control system according to the invention.

FIG. 2 shows a schematic diagram illustrating an example of speed variation for a vehicle provided with a brake cruise control system according to the invention. As indicated in the figure, a vehicle 200 equipped with brake cruise control is travelling along an initial road section X0 and is approaching a downhill slope. At a first point A the vehicle 200 is travelling at a speed that is equal to a first brake set speed vB1. During a first downhill section X1 the vehicle will begin to accelerate and the brake cruise control system, being arranged to monitor the current vehicle speed, will attempt to reduce the speed to maintain the first brake set speed vB1. The speed reduction is initially carried out by means of at least one auxiliary brake, preferably an engine retarder. Provided that the gradient of the downhill slope is not excessive, the vehicle speed can be maintained below a predetermined overspeed vLIM, as indicated by the dashed curve in FIG. 2. However, at greater gradients the overspeed vLIM can be exceeded as indicated by the full curve in FIG. 2. In the latter case, the brake cruise control system can automatically actuate the service brake to assist the auxiliary brake in limiting the speed. Actuation of the service brakes under such conditions can trigger a warning to the driver, as extended use of the service brakes during steep or long downhill slopes is undesirable.

At a second point B, the driver intervenes to reduce the speed by manual actuation of the service brakes, e.g. by depressing the brake pedal. When the central control unit (ECU) provided in the vehicle (see FIG. 1) detects manual application of the service brake, then the ECU is automatically arranged to perform a number of steps to reduce the speed, which steps do not require further actions from the driver.

In a first step, the ECU sets the brake set speed to a second brake set speed vB2 that is lower than the first brake set speed vB1. The second brake set speed vB2 is selected by the ECU a level where the lower speed can be maintained by the auxiliary brakes only. Alternatively, the ECU is arranged to set the second brake set speed vB2 at the vehicle speed detected when the driver releases the service brakes. The action of setting a lower brake set speed can trigger an automated response from, for instance, the service brakes which can perform a brief, more pronounced vehicle retardation, or the transmission which can perform a downchange to a lower gear. The response to the lowering of the brake set speed can be dependant of the currently detected road gradient. In FIG. 2, the vehicle is retarded from point B towards point C over a second downhill section X2 as the speed is reduced towards the second brake set speed vB2.

In a second step, the ECU will apply a brake torque using at least the auxiliary brake, preferably only the auxiliary brake, if a detected current vehicle speed exceeds the second brake set speed vB2. In FIG. 2 this is illustrated by point C, where the ECU determines that the auxiliary brake can be used for retarding the vehicle the vehicle towards and to maintain the second brake set speed vB2 over a third downhill section X3.

Under certain conditions where the gradient is greater than the standardized norm for public roads, the above steps can be repeated if the driver reapplies the service brakes to reduce the speed further.

At point D the control unit detects that the downhill condition has ended. According to a first alternative example the ECU is then arranged to restore the brake cruise control brake set speed to the first brake set speed vB1 wherein the vehicle speed is increased to the first brake set speed vB1 by the cruise control system over a fourth road section X4. The control unit is arranged to perform this action in response to one or more signals transmitted to the control unit by an inclination sensor, an accelerometer, an on-board topographic database, a OPS-receiver, or a similar suitable device. One or more of these signals, in combination with a detected absence of auxiliary brake actuation, can be used to detect that the downhill condition has ended.

According to a second alternative example the ECU is then arranged to restore the brake cruise control brake set speed to the first brake set speed vB1 when the driver issues a resume command. Such a manual resume command can involve the driver actuating an accelerator means or a resume switch on the dashboard, or on or adjacent the steering wheel (see FIG. 1).

Figure 3A:
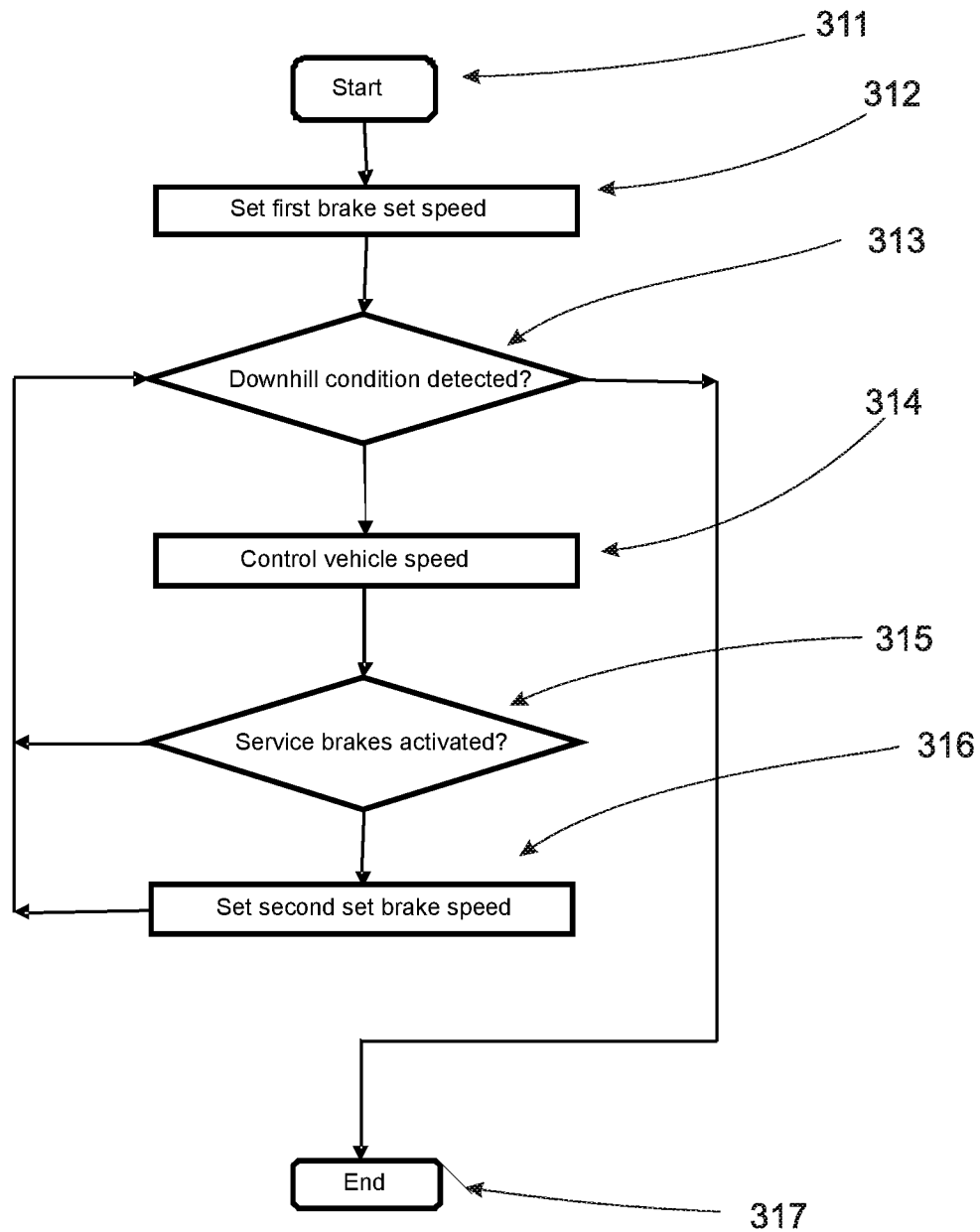
FIG. 3A shows a schematic flow chart for performing the method according to the invention.

FIG. 3A shows a schematic flow chart for performing the method according to the invention in a vehicle equipped with a brake cruise control system. As can be seen from the figure, the process is started in a first step 311, where after a first brake set speed is set by the driver in a second step 312. In a third step 313 a downhill condition is detected, causing the brake cruise control system to control the vehicle speed in order to maintain the first brake set speed in a fourth step 314. In this step, a number of parameters such as the vehicle speed and road gradient are monitored and at least the auxiliary brakes are applied if the speed exceeds the first brake set speed. If no downhill condition is detected in the third step 313 then the process is ended in a final step 317.

If the downhill condition continues, then an additional check is performed in a fifth step 315 to detect if the service brakes have been manually actuated or not. If the service brakes have not been actuated by the driver, then the process returns to the third step 313 to determine if the downhill condition continues. The process then proceeds to the fourth step 314 to continue performing brake cruise control for maintaining the first brake set speed. On the other hand, if the service brakes have been actuated by the driver, then the process continues to sixth step 316, where the brake set speed to a second brake set speed that is lower than the first brake set speed. The second brake set speed is set automatically by the brake cruise control system and can be selected from a stored table or matrix, and/or depending on parameters such as the current road gradient. Alternatively, the second brake set speed can be set to the speed detected when the driver releases the service brakes. The process then returns to the third step 313 to check if a downhill condition exists. If this is the case then it proceeds to the fourth step 314 to continue performing brake cruise control to maintain the lower second brake set speed. As the set brake speed is now lowered, the brake cruise control system can be required to perform a downshift and/or additional actions to reduce the vehicle speed to the new set brake speed. The process then resumes as described above.

The process as described above is continued as long as a downhill condition is detected in the third step 313. When the brake cruise control system detects that the downhill condition has ended, then the process leaves the control loop and proceeds from the third step 313 to a final step 317. The end of a downhill condition is preferably detected automatically by the brake cruise control system, e.g. by monitoring the road gradient. Alternatively, the end of a downhill condition is detected when the driver actuates the accelerator or a switch provided for this purpose. The process is ended in the final step 317 and reverts to regularly monitoring the detected parameters, only to be resumed if a subsequent downhill condition is detected. If the brake set speed has been changed during a previous downhill section then it is automatically reset to the first set brake speed prior to a subsequent downhill section.

Figure 3B:
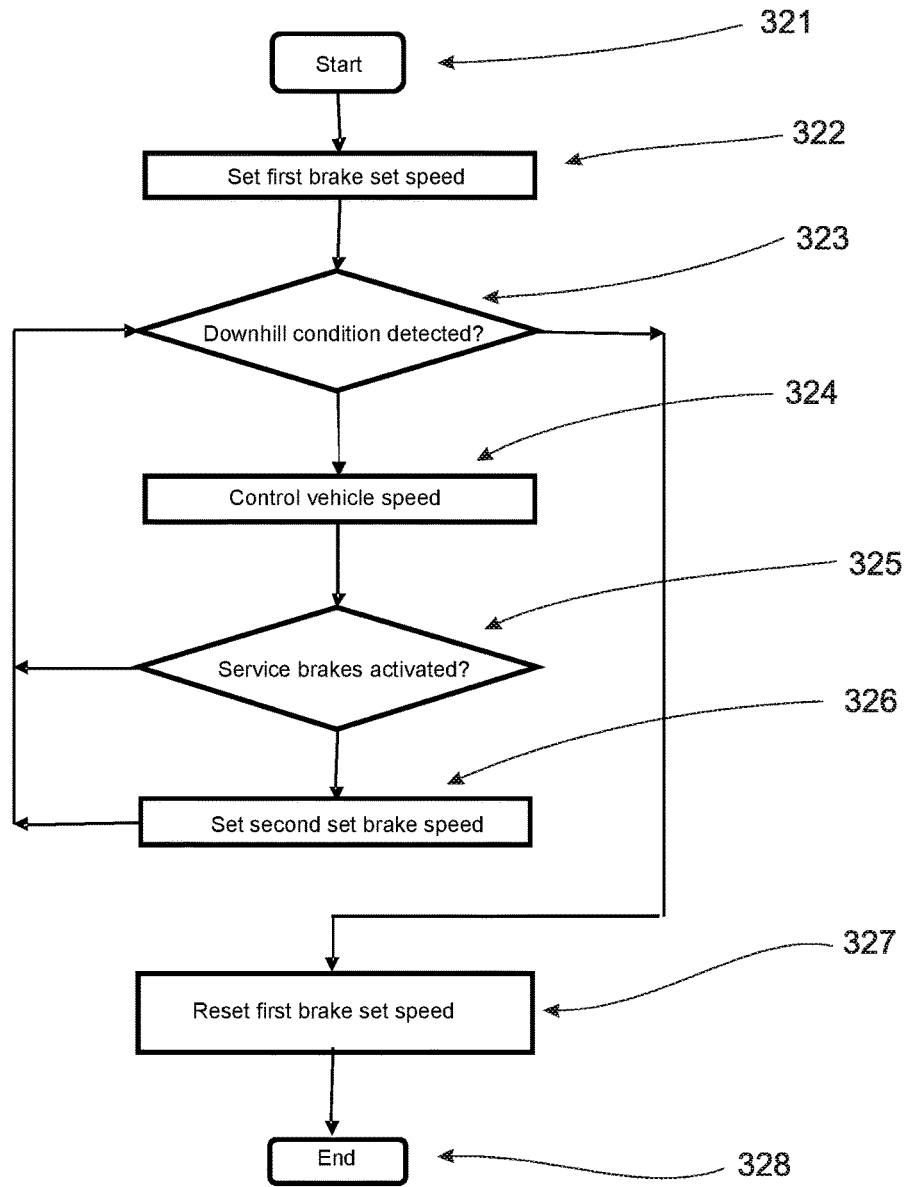
FIG. 3B shows an alternative schematic flow chart for performing the method according to the invention.

FIG. 3B shows an alternative schematic flow chart for performing the method according to the invention in a vehicle equipped with a brake cruise control system. As can be seen from the figure, the process is started in a first step 321, where after a first brake set speed can be set by the driver in a second step 322. The first brake set speed can be set once by the driver and is then stored in the control unit for future use. Alternatively, the system can prompt the driver for an input, e.g. by displaying the currently stored set speed value, and if no input is provided by the driver then the stored first brake set speed is used. In a third step 323 a downhill condition is detected, causing the brake cruise control system to control the vehicle speed in order to maintain the first brake set speed in a fourth step 324. In this step, a number of parameters such as the vehicle speed and road gradient are monitored and at least the auxiliary brakes are applied if the speed exceeds the first brake set speed.

If the downhill condition continues, then an additional check is performed in a fifth step 325 to detect if the service brakes have been manually actuated or not. If the service brakes have not been actuated by the driver, then the process returns to the third step 323 to determine if the downhill condition continues. The process then proceeds to the fourth step 324 to continue performing brake cruise control for maintaining the first brake set speed. On the other hand, if the service brakes have been actuated by the driver, then the process continues to sixth step 326, where the brake set speed to a second brake set speed that is lower than the first brake set speed. The second brake set speed is set automatically by the brake cruise control system and can be selected from a stored table or matrix, and/or depending on parameters such as the current road gradient. Alternatively, the second brake set speed can be set to the speed detected when the driver releases the service brakes. The process then returns to the fourth step 324, via the third step 323, to continue performing brake cruise control to maintain the lower second brake set speed. As the set brake speed is now lowered, the brake cruise control system can be required to perform a downshift and/or additional actions to reduce the vehicle speed to the new set brake speed. The process then resumes as described above.

The process as described above is continued as long as a downhill condition is detected in the third step 323. When the brake cruise control system detects that the downhill condition has ended, then the process leaves the control loop and proceeds from the third step 323 to a seventh step 327. The end of a downhill condition is preferably detected automatically by the brake cruise control system, e.g. by monitoring the road gradient. Alternatively, the end of a downhill condition is detected when the driver actuates the accelerator or a switch provided for this purpose. In the seventh step 327 it is determined if the set brake speed has been changed or not. If the set brake speed has not been changed then no action is required, and if the brake set speed has been changed then it is reset to the first set brake speed.

The process is ended in a final step 328 and reverts to monitoring the detected parameters, only to be resumed if a subsequent downhill condition is detected. If the brake set speed has been changed during a previous downhill section then it is automatically reset to the first set brake speed prior to a subsequent downhill section.

The present invention also relates to a computer program, computer program product and a storage medium for a computer all to be used with a computer for executing the method as described in any one of the above examples.

Figure 4:
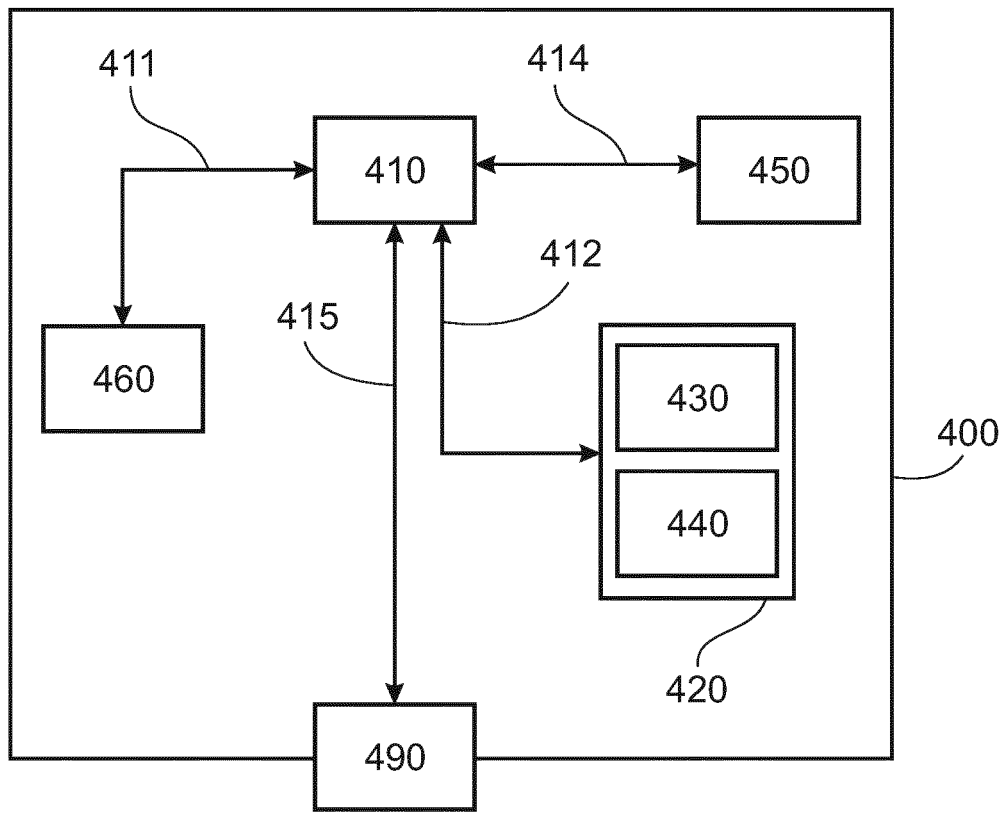
FIG. 4 shows the invention applied on a computer arrangement.

FIG. 4 shows an apparatus 400 according to one embodiment of the invention, comprising a non-volatile memory 420, a processor 410 and a read and write memory 460. The memory 420 has a first memory part 430, in which a computer program for controlling the apparatus 400 is stored. The computer program in the memory part 430 for controlling the apparatus 400 can be an operating system.

The apparatus 400 can be enclosed in, for example, a control unit, such as the control unit 45. The data-processing unit 410 can comprise, for example, a microcomputer. The memory 420 also has a second memory part 440, in which a program for controlling the vehicle speed control system according to the invention is stored. In an alternative embodiment, the program for controlling the vehicle speed control system is stored in a separate non-volatile storage medium 450 for data, such as, for example, a CD or an exchangeable semiconductor memory. The program can be stored in an executable form or in a compressed state.

When it is stated below that the data-processing unit 410 runs a specific function, it should be clear that the data-processing unit 410 is running a specific part of the program stored in the memory 440 or a specific part of the program stored in the non-volatile storage medium 420.

The data-processing unit 410 is tailored for communication with the storage memory 420 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

It is to be understood that the present invention is not limited to the embodiments described above and illustrated in the drawings; rather, the skilled person will recognize that many changes and modifications may be made within the scope of the appended claims.

The invention claimed is:

1. Method for controlling vehicle speed in a vehicle equipped with brake cruise control when the vehicle is travelling downhill, which method comprises the steps of:
    driving a vehicle downhill with the brake set speed set to a first brake set speed;
    automatically applying a brake torque using at least an auxiliary brake to maintain a vehicle speed at the first brake set speed;
    detecting a manual application of a vehicle service brake which decreases the vehicle speed below the first brake set speed; and
    when the manual application of the service brake occurs, then automatically, via the control unit, performing the steps of:
        setting the brake set speed to a second brake set speed that is lower than the first brake set speed, and
        applying a brake torque using at least the auxiliary brake when a detected current vehicle speed exceeds the second brake set speed;
    after the setting of the brake set speed to the second brake set speed, determining that the detected current vehicle speed exceeds the second brake set speed with the auxiliary brake engaged; and
    in response to the detected current vehicle speed exceeding the second brake set speed, automatically applying, via the control unit, the service brake in conjunction with the auxiliary brake.

2. Method according to claim 1, comprising setting the second brake set speed at the vehicle speed detected when the driver released the service brakes.

3. Method according to claim 1, comprising restoring the brake cruise control brake set speed to the first brake set speed when the control unit detects that the downhill condition has ended.

4. Method according to claim 1, comprising restoring the brake cruise control brake set speed to the first brake set speed when the driver issues a resume command.

5. Method according to claim 4, comprising restoring the brake set speed to the first brake set speed when the driver actuates an accelerator means.

6. Method according to claim 4, comprising restoring the brake cruise control set speed to the first brake set speed when the driver actuates a resume switch.

7. Vehicle speed control system in a vehicle equipped with brake cruise control when the vehicle is travelling downhill, which system comprises:
- a sensor arranged to detect a current vehicle speed;
- a service brake;
- at least one auxiliary brake; and
- a control unit having a user selectable input for receiving a brake set speed, the control unit being arranged to:
- compare the current vehicle speed with a first brake set speed and control the auxiliary brakes to maintain the first brake set speed;
- detect if the service brake is manually applied to retard the vehicle speed; and
- when a manual application of the service brakes is detected, automatically:
- setting the brake set speed to a second brake set speed that is lower than the first brake set speed, and
- applying a brake torque using at least the auxiliary brake when the current vehicle speed exceeds the second brake set speed;
- after the setting of the brake set speed to the second brake set speed, determining that the detected current vehicle speed exceeds the second brake set speed with the auxiliary brake engaged; and
- in response to the detected current vehicle speed exceeding the second brake set speed, automatically applying, via the control unit, the service brake in conjunction with the auxiliary brake.

8. Vehicle speed control system according to claim 7, wherein the control unit is arranged to set the second brake set speed at the vehicle speed detected when the driver released the service brakes.

9. Vehicle speed control system according to claim 7, wherein the control unit is arranged to restore the brake set speed to the first brake set speed when the control unit has detected that the downhill condition has ended.

10. Vehicle speed control system according to claim 7, wherein the control unit is arranged to restore the brake set speed to the first brake set speed when the driver issues a resume command.

11. A computer comprising a computer program or performing the steps of claim 1 for controlling vehicle speed in a vehicle equipped with brake cruise control when the program is run on the computer.

12. A non-transitory computer readable medium carrying a computer program comprising program code means for performing the steps of claim 1 for controlling vehicle speed in a vehicle equipped with brake cruise control when the program product is run on a computer.

13. A control unit for controlling vehicle speed in a vehicle equipped with brake cruise control, the control unit being configured to perform the steps of the method according to claim 1.

* * * * *